US011022727B2

(12) United States Patent
Igasaki et al.

(10) Patent No.: US 11,022,727 B2
(45) Date of Patent: Jun. 1, 2021

(54) VARIABLE FOCAL LENGTH LENS APPARATUS AND CONTROL METHOD

(71) Applicant: MITUTOYO CORPORATION, Kanagawa (JP)

(72) Inventors: Shiro Igasaki, Kanagawa (JP); Nobuo Ooba, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/549,323

(22) Filed: Aug. 23, 2019

(65) Prior Publication Data

US 2020/0073024 A1 Mar. 5, 2020

(30) Foreign Application Priority Data

Aug. 30, 2018 (JP) .............................. JP2018-161550

(51) Int. Cl.
*G02B 3/14* (2006.01)
*G02B 15/14* (2006.01)
*G02B 7/02* (2021.01)

(52) U.S. Cl.
CPC .............. *G02B 3/14* (2013.01); *G02B 15/14* (2013.01); *G02B 7/02* (2013.01)

(58) Field of Classification Search
CPC ........ G02B 15/14; G02B 7/02; G02B 21/241; G02B 21/0016; G02B 26/004; G02F 1/33; G02F 2001/294
See application file for complete search history.

(56) References Cited

U.S. PATENT DOCUMENTS

| 10,458,779 B2 | 10/2019 | Haitjema et al. | |
| 2010/0177376 A1* | 7/2010 | Arnold ................. | G02B 3/0087 359/307 |
| 2012/0127582 A1* | 5/2012 | Obu ........................ | G02B 3/14 359/676 |
| 2013/0063805 A1* | 3/2013 | Arnold ..................... | G02B 3/14 359/311 |
| 2015/0264248 A1* | 9/2015 | Ohta .................... | H04N 5/2257 348/345 |

(Continued)

FOREIGN PATENT DOCUMENTS

| JP | H11-23219 A | 1/1999 |
| JP | 2009-122105 A | 6/2009 |
| JP | 2018-189700 A | 11/2018 |

OTHER PUBLICATIONS

U.S. Appl. No. 16/556,546 to Shiro Igasaki et al., filed Aug. 30, 2019.

(Continued)

*Primary Examiner* — Gevell V Selby
(74) *Attorney, Agent, or Firm* — Greenblum & Bernstein, P.L.C.

(57) ABSTRACT

A variable focal length lens apparatus includes a liquid lens apparatus in which the refractive index changes in accordance with an input drive signal, and a drive controller that outputs the drive signal to the liquid lens apparatus. The drive controller includes a resonance lock controller that changes a frequency of the drive signal by tracking the drive signal to a resonance frequency of the liquid lens apparatus, and a tracking delayer that delays a change in the frequency of the drive signal that is due to the resonance lock controller.

4 Claims, 6 Drawing Sheets

(56) References Cited

U.S. PATENT DOCUMENTS

| | | |
|---|---|---|
| 2018/0314033 A1 | 11/2018 | Sakai et al. |
| 2018/0314041 A1 | 11/2018 | Igasaki et al. |
| 2018/0314042 A1 | 11/2018 | Igasaki et al. |
| 2019/0353872 A1* | 11/2019 | Sakai .................. H04N 5/2254 |
| 2019/0356860 A1 | 11/2019 | Sakai et al. |

OTHER PUBLICATIONS

U.S. Appl. No. 16/519,117 to Koji Kubo et al., filed Jul. 23, 2019.
U.S. Appl. No. 16/527,486 to Koji Kubo, filed Jul. 31, 2019.
U.S. Appl. No. 16/519,359 to Koji Kubo, filed Jul. 23, 2019.
U.S. Appl. No. 16/549,323 to Shiro Igasaki et al., filed Aug. 23, 2019.
U.S. Appl. No. 16/414,148 to Hiroshi Sakai et al., filed May 16, 2019.

* cited by examiner

VARIABLE FOCAL LENGTH LENS APPARATUS AND CONTROL METHOD

CROSS-REFERENCE TO RELATED APPLICATIONS

The present application claims priority under 35 U.S.C. § 119 of Japanese Application No. 2018-161550, filed on Aug. 30, 2018, the disclosure of which is expressly incorporated by reference herein in its entirety.

BACKGROUND OF THE INVENTION

1. Field of the Invention

The present invention relates to a variable focal length lens apparatus and a variable focal length lens control method.

2. Description of Related Art

As a variable focal length lens apparatus, an apparatus has been developed that uses a liquid lens system (hereafter referred to simply as "lens system") operating on a principle described by the specification of U.S. Published Patent Application No. 2010/0177376, for example. The liquid lens system is formed by immersing in transparent liquid a hollow cylindrical oscillating member that is formed of a piezoelectric material. In the liquid lens system, when AC voltage is applied to an inner circumferential surface and outer circumferential surface of the oscillating member, the oscillating member expands and contracts in a thickness direction and oscillates the liquid inside the oscillating member. By adjusting a frequency of the applied voltage according to the natural frequency of the liquid, a standing wave of concentric circles is formed in the liquid and concentric circular regions having different refractive indexes are formed centered on a center axis line of the oscillating member. In this state, when light transits along the center axis line of the oscillating member, the light travels along a path that either disperses or converges the light in accordance with the refractive index of each concentric circular region.

The liquid lens system described above and an objective lens for bringing the light into focus (for example, an ordinary convex lens or a group of lenses) are arranged on the same optical axis to configure a variable focal length lens apparatus. The liquid lens system is packaged as a liquid lens apparatus and is incorporated into the variable focal length lens apparatus. When parallel light strikes the ordinary objective lens, light passing through the lens comes into focus at a focal point position that lies at a predetermined focal length. In contrast, when parallel light strikes the lens system arranged coaxially with the objective lens, the light is either dispersed or converged by the lens system and the light transiting the objective lens comes into focus at a position offset either farther away or closer than the original (state with no lens system) focal point position. Accordingly, in the variable focal length lens apparatus, a drive signal (AC voltage of a frequency that generates a standing wave in the interior liquid) that is input to the lens system is applied, and by increasing and decreasing the amplitude of the drive signal, the focal point position of the variable focal length lens apparatus can be controlled as desired within a set range (a predetermined amount of change over which increase and decrease by the lens system is possible, with the focal length of the objective lens as a reference).

In the variable focal length lens apparatus, a sinusoidal AC signal is used as an exemplary drive signal that is input to the lens system. When such a drive signal is input, the focal length (focal point position) of the variable focal length lens apparatus changes sinusoidally. In this case, when the amplitude of the drive signal is 0, the light transiting the lens system is not refracted and the focal length of the variable focal length lens apparatus is the focal length of the objective lens. When the amplitude of the drive signal is at a positive or negative peak, the light transiting the lens system is maximally refracted and the focal length of the variable focal length lens apparatus is in a state having the greatest change from the focal length of the objective lens. When an image is obtained using a variable focal length lens apparatus of this kind, a light emission signal is output to provide pulse illumination, synchronized with the phase of the sine wave of the drive signal. Accordingly, by providing pulse illumination in a state that is focused at a predetermined focal length, from among the sinusoidally changing focal lengths, the image of the object at the focal length is detected. Pulse illumination is performed at a plurality of phases that make up one period, and when image detection is performed in accordance with each phase, images at a plurality of focal lengths can be obtained simultaneously.

In the variable focal length lens apparatus described above, by performing control (resonance locking) to automatically track the drive signal to the frequency at which the standing wave is achieved, the standing wave can be formed with the greatest efficiency for the liquid lens system. However, in a variable focal length lens apparatus with resonance locking, when there is a change in frequency due to the resonance locking during an image measurement operation, for example, the timing to achieve an identical focal length may change, and the image accuracy that can be obtained may decrease. Specifically, when there is a large change in frequency due to resonance locking while an operator is conducting an image measurement, a momentary change such as a flicker may occur in a displayed image, and the operator may suffer visual discomfort and be subjected to a burden similar to motion-sickness. In view of this, a configuration of a variable focal length lens apparatus is sought in which a high-quality image can be obtained that reduces or eliminates visual discomfort caused by resonance locking.

SUMMARY OF THE INVENTION

The present invention provides a variable focal length lens apparatus and variable focal length lens control method that are capable of efficiently generating a standing wave and also capable of acquiring a high-quality image.

A variable focal length lens apparatus according to the present invention includes a liquid lens system in which the refractive index changes in accordance with an input drive signal, and a drive controller that outputs the drive signal to the liquid lens system. The drive controller includes a resonance lock controller that changes a frequency of the drive signal by tracking the drive signal to a resonance frequency of the liquid lens system, and a tracking delayer that delays a change in the frequency of the drive signal that is due to the resonance lock controller.

In the present invention, a time delay element that delays the change in the frequency of the drive signal that is due to the resonance lock controller can be used as the tracking delayer, for example. Also, the change may be delayed using a limiter element that limits an amount of change or a rate of change per amount of time for the frequency of the drive signal. According to the present invention, even when the amount of change or the rate of change in the frequency of the drive signal due to the resonance lock controller is large, by delaying the change, the change can be constrained to a gentle change, and a degradation in quality due to a major change in frequency, such as flickering in a measurement image, can be avoided. As a result, in the variable focal length lens apparatus, the standing wave can be generated efficiently while obtaining a high-quality image. By using a computer system having a high processing capability for the drive controller, a processing cycle of the resonance lock controller can be sped up and, as a result, the amount of change or rate of change of the frequency per cycle can be reduced and flickering in the image or the like can be avoided. However, a computer system having a high processing capability is expensive and cannot be used readily. However, according to the present invention, flickering in an image or the like can be avoided using the tracking delayer, without speeding up the cycle of the resonance lock control, and the necessity of a computer system having a high processing capability can be eliminated, and a low-cost variable focal length lens apparatus can be readily achieved.

In the variable focal length lens apparatus according to the present invention, the tracking delayer is preferably a low-pass filter. In the present invention, a high frequency component of a change in frequency (component where a change behavior is rapid) is eliminated from a drive signal whose frequency is modified by the resonance lock controller, and only a low frequency component of the drive signal (component where the change behavior is slow) is input to the liquid lens system. The change in frequency is restricted to the low frequency component, and as a result, the drive signal that is changed by tracking to the resonance frequency of the liquid lens system is limited to gentle changes even when changes are drastic originally. Accordingly, an ability to delay changes in the drive signal can be obtained using the low-pass filter. Also, a simple configuration in which the low-pass filter is applied to the drive signal output from the resonance lock controller is sufficient as the tracking delayer, and stable functionality can be achieved at a low cost.

The variable focal length lens apparatus according to the present invention preferably includes a resonance lock console that switches the resonance lock controller between enabled and disabled, and switches the tracking delayer between enabled and disabled. In the present invention, enabling and disabling the resonance lock controller can be selected at any time, and also enabling and disabling the tracking delayer can be selected at any time while the resonance lock controller is enabled, and an operator can achieve a desired display while observing image quality.

A control method of a variable focal length lens apparatus according to the present invention uses a liquid lens system in which the refractive index changes in accordance with an input drive signal and a drive controller that outputs the drive signal to the liquid lens system. The method performs resonance lock control that causes the drive signal to track to a resonance frequency of the liquid lens system, and also delays a change in the frequency of the drive signal when an amount of change in the frequency of the drive signal that is due to the resonance lock control exceeds a predetermined limit value. In the present invention, the effects described for the above-mentioned variable focal length lens apparatus according to the present invention can be obtained.

The present invention can provide a variable focal length lens apparatus and variable focal length lens control method that are capable of efficiently generating a standing wave and also capable of acquiring a high-quality image.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings.

Variable Focal Length Lens Apparatus 1

Figure 1:
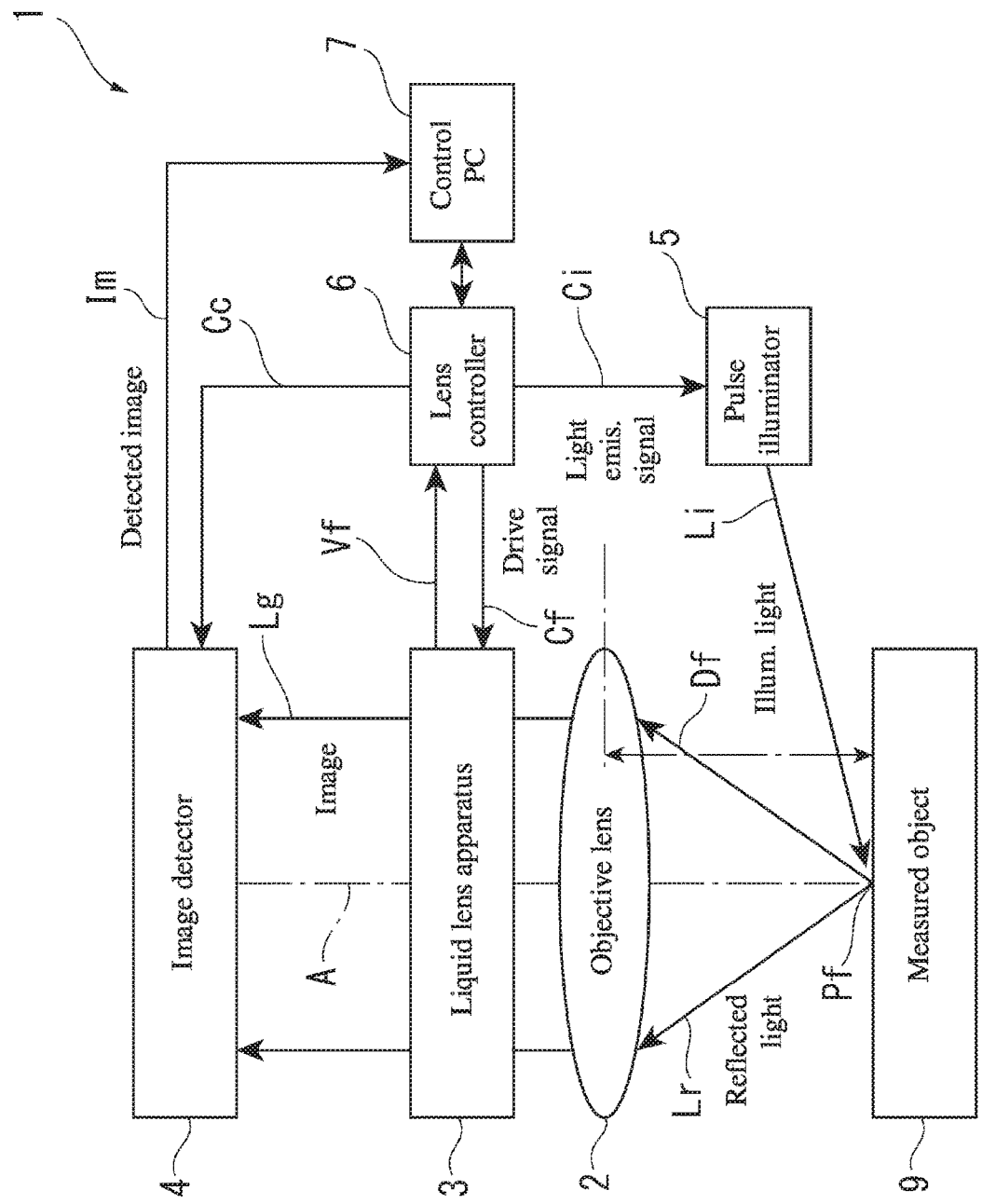
FIG. 1 is a schematic view illustrating an embodiment of a variable focal length lens apparatus of the present invention.

In FIG. 1, a variable focal length lens apparatus 1 detects an image of a surface of a measured object 9 while varying a focal length. In order to do this, the variable focal length lens apparatus 1 is provided with an objective lens 2 and a liquid lens apparatus 3 that are arranged on the same optical axis A that intersects with the surface; an image detector 4 that detects an image of the measured object 9, which is obtained through the objective lens 2 and the liquid lens apparatus 3; and a pulse illuminator 5 that provides pulse illumination of the surface of the measured object 9. In the variable focal length lens apparatus 1, a variable focal length lens is configured by the objective lens 2 and the liquid lens apparatus 3.

Moreover, the variable focal length lens apparatus 1 is provided with a lens controller 6 that controls operation of the liquid lens apparatus 3 and the pulse illuminator 5, and a control PC 7 for operating the lens controller 6. The control PC 7 is configured by a known personal computer and achieves expected functionality by running predetermined control software. The control PC 7 also includes the ability to import and process images from the image detector 4.

The objective lens 2 is configured by a known convex lens. The image detector 4 is configured by a known charge coupled device (CCD) image sensor or some other form of camera or the like, and can output to the control PC 7 an incident image Lg as a detected image Im having a predetermined signal form. The pulse illuminator 5 is configured by a light emitting element such as a light emitting diode (LED), and when a light emission signal Ci is input from the lens controller 6, illumination light Li can be emitted for a predetermined amount of time and pulse illumination of the surface of the measured object 9 can be provided. The illumination light Li is reflected by the surface of the measured object 9, and reflected light Lr from the surface of the measured object 9 passes through the objective lens 2 and the liquid lens apparatus 3 to create the image Lg.

The liquid lens apparatus 3 is configured with a liquid lens system on an interior thereof, and a refractive index of the liquid lens apparatus 3 changes in response to a drive signal Cf input from the lens controller 6. The drive signal Cf is a sinusoidal AC signal of a frequency that generates a standing wave in the liquid lens apparatus 3. In the variable focal length lens apparatus 1, a focal length Df to a focal point position Pf can be changed as desired by changing the refractive index of the liquid lens apparatus 3 with the focal length of the objective lens 2 as a reference.

Liquid Lens Apparatus 3

Figure 2:
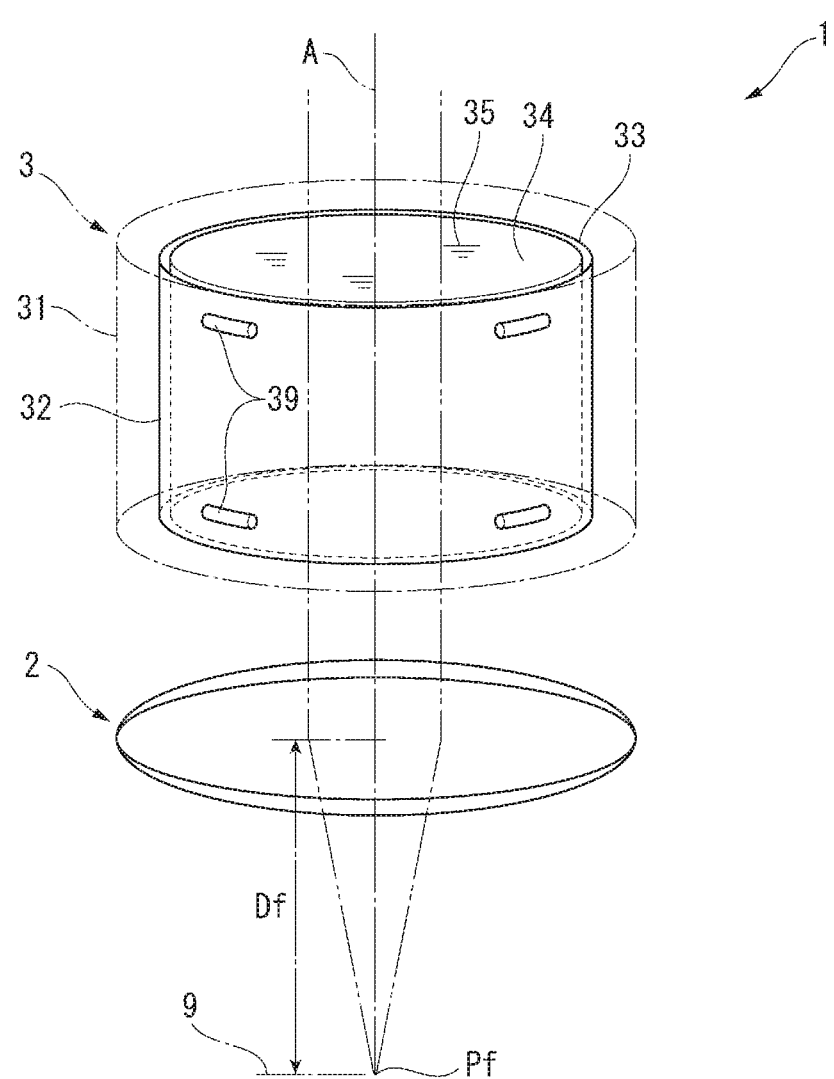
FIG. 2 is a schematic view illustrating a configuration of a liquid lens apparatus according to the embodiment.

In FIG. 2, the liquid lens apparatus 3 includes a hollow cylindrical case 31, and a hollow cylindrical oscillating member 32 is installed on an interior of the case 31. The oscillating member 32 is supported by spacers 39 made of an elastomer that are disposed between an outer circumferential surface 33 of the oscillating member 32 and an inner circumferential surface of the case 31. The oscillating member 32 is a member where a piezoelectric material is formed in a hollow cylindrical shape. The oscillating member 32 oscillates in a thickness direction due to an AC voltage of the drive signal Cf being applied between the outer circumferential surface 33 and the inner circumferential surface 34. The interior of the case 31 is filled with a highly transparent liquid 35, the entire oscillating member 32 is immersed in the liquid 35, and an inner side of the hollow cylindrical oscillating member 32 is filled with the liquid 35. The AC voltage of the drive signal Cf is adjusted to a frequency that generates a standing wave in the liquid 35 on the inner side of the oscillating member 32.

Figure 3:
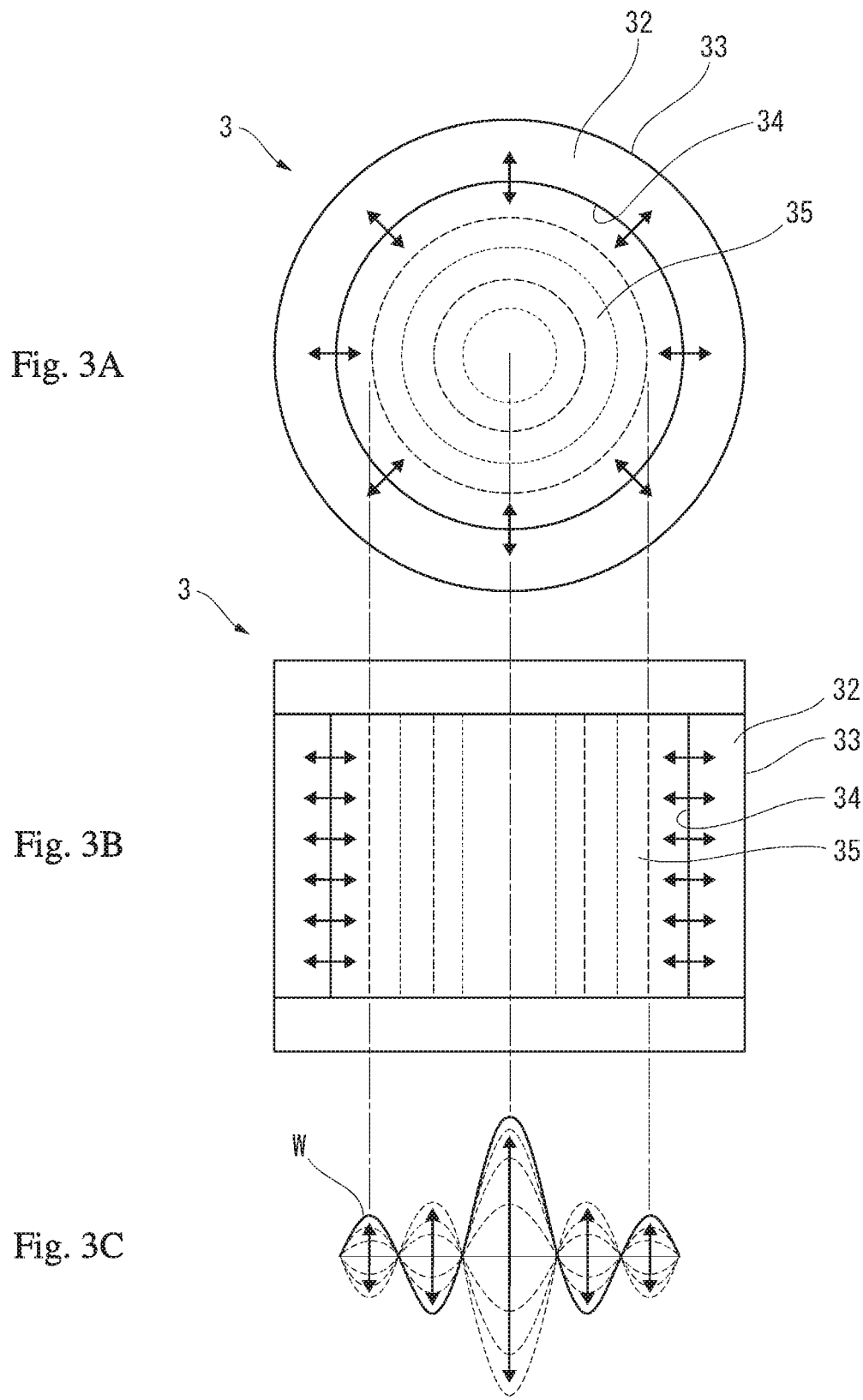
FIGS. 3A to 3C are schematic views illustrating oscillation states of the liquid lens apparatus according to the embodiment.
Figure 4:
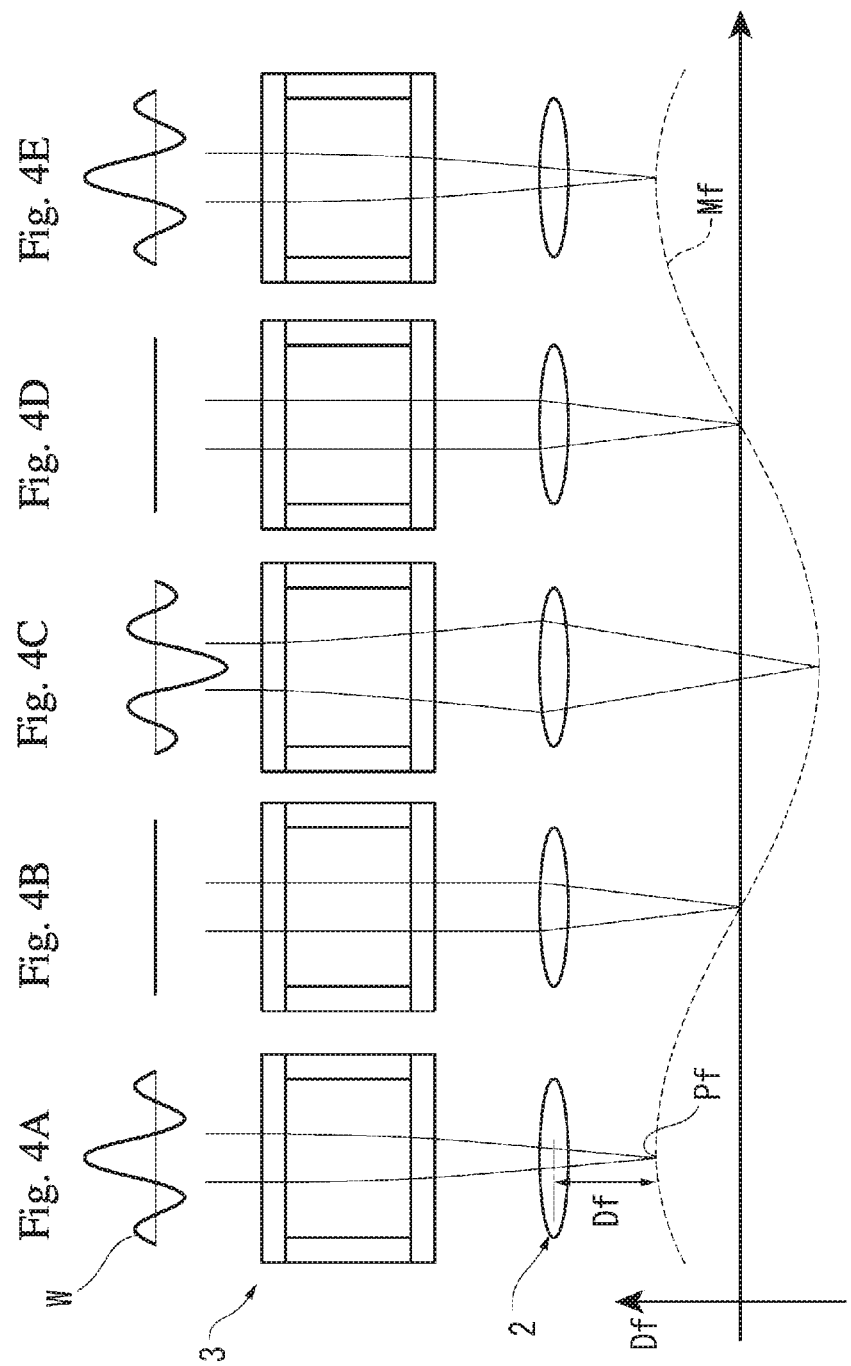
FIGS. 4A to 4E are schematic views illustrating focal lengths of the liquid lens apparatus according to the embodiment.

As shown in FIGS. 3A to 3C, in the liquid lens apparatus 3, when the oscillating member 32 is oscillated, a standing wave arises in the interior liquid 35 and concentric circular regions arise in which the refractive index alternates (see FIGS. 3A and 3B). At this point, a relationship between a distance from a center axis line of the liquid lens apparatus 3 (radius) and the refractive index of the liquid 35 is as shown by a refractive index distribution W illustrated in FIG. 3C.

In FIGS. 4A to 4E, because the drive signal Cf is a sinusoidal AC signal, bands in the refractive index distribution W of the liquid 35 in the liquid lens apparatus 3 also change in accordance with the drive signal Cf. Also, the refractive index of the concentric circular regions that arise in the liquid 35 changes sinusoidally, and accordingly the focal length Df to the focal point position Pf changes sinusoidally. In the state depicted in FIG. 4A, an amplitude of the refractive index distribution W is at its largest, the liquid lens apparatus 3 causes transiting light to converge, the focal point position Pf is closer, and the focal length Df is at its shortest. In the state depicted in FIG. 4B, the refractive index distribution W is flat, the liquid lens apparatus 3 allows transiting light to transit unaffected, and the focal point position Pf and the focal length Df are at standard values. In the state depicted in FIG. 4C, the amplitude of the refractive index distribution W is at its largest at the opposite pole from that of FIG. 4A, the liquid lens apparatus 3 causes transiting light to scatter, the focal point position Pf is farther, and the focal length Df is at its maximum. In the state depicted in FIG. 4D, once again the refractive index distribution W is flat, the liquid lens apparatus 3 allows transiting light to transit unaffected, and the focal point position Pf and the focal length Df are at standard values. The state depicted in FIG. 4E returns once again to the state depicted in FIG. 4A and similar fluctuations are repeated thereafter.

In this way, in the variable focal length lens apparatus 1, the drive signal Cf is a sinusoidal AC signal, and the focal point position Pf and the focal length Df also fluctuate sinusoidally, as in a focal point fluctuation waveform Mf in FIGS. 4A to 4E. At this time, pulse illumination is provided to the measured object 9 located at the focal point position Pf at a desired point in time on the focal point fluctuation waveform Mf, and when an image illuminated at that point in time is detected, an image is obtained of the focal point position Pf at the focal length Df at the desired time of illumination.

Lens Controller 6

Figure 5:
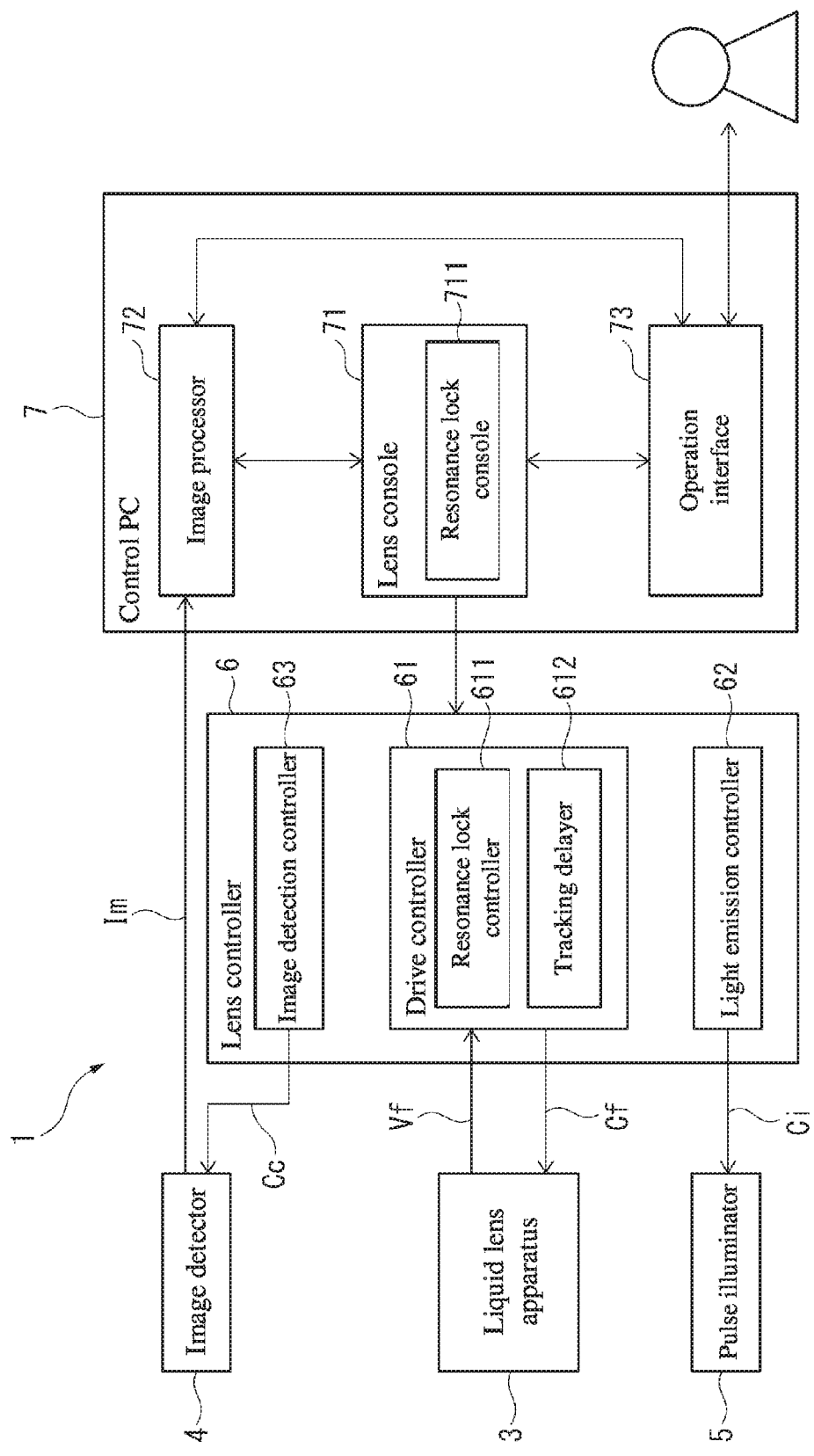
FIG. 5 is a block diagram illustrating control components according to the embodiment.

As illustrated in FIG. 5, in the variable focal length lens apparatus 1, oscillation of the liquid lens apparatus 3, light emission of the pulse illuminator 5, and image detection of the image detector 4 are respectively controlled by the drive signal Cf, the light emission signal Ci, and an image detection signal Cc from the lens controller 6. At this point, an effective power, drive current, or the like applied to the liquid lens apparatus 3 is returned to the lens controller 6 as an oscillation state Vf of the liquid lens apparatus 3. The lens controller 6 includes a drive controller 61 that outputs the drive signal Cf to the liquid lens apparatus 3, a light emission controller 62 that outputs the light emission signal Ci to the pulse illuminator 5, and an image detection controller 63 that outputs the image detection signal Cc to the image detector 4. The drive controller 61 includes a resonance lock controller 611 and a tracking delayer (tracking delay controller) 612.

Resonance Lock Controller 611

When the liquid lens apparatus 3 oscillates based on the input drive signal Cf, the resonance lock controller 611 detects the oscillation state Vf of the liquid lens apparatus 3 from the effective power or drive current that is applied to the liquid lens apparatus 3. Then, the frequency of the drive signal Cf is changed with reference to oscillation state Vf of the liquid lens apparatus 3, and thereby the frequency can be locked to the present resonance frequency of the liquid lens apparatus 3. The oscillation state Vf may also be detected by an oscillation sensor installed in the liquid lens apparatus 3.

Tracking Delayer 612

The tracking delayer 612 is a low-pass filter that is connected to an output stage of the resonance lock controller 611, and has the ability to delay a change in the frequency of the drive signal Cf caused by the resonance lock controller 611. Specifically, a high frequency component is eliminated from the change in frequency of the drive signal Cf that is modified by the resonance lock controller 611, and only a low frequency component with low-speed behavior is input to the liquid lens apparatus 3. The change in frequency of the drive signal Cf is restricted to the low frequency component, and as a result, the frequency of the drive signal Cf that is modified by tracking to the resonance frequency of the liquid lens apparatus 3 is limited to gentle changes even when changes are drastic originally. Accordingly, an ability to delay changes in the drive signal Cf can be obtained using the low-pass filter.

Figure 6:
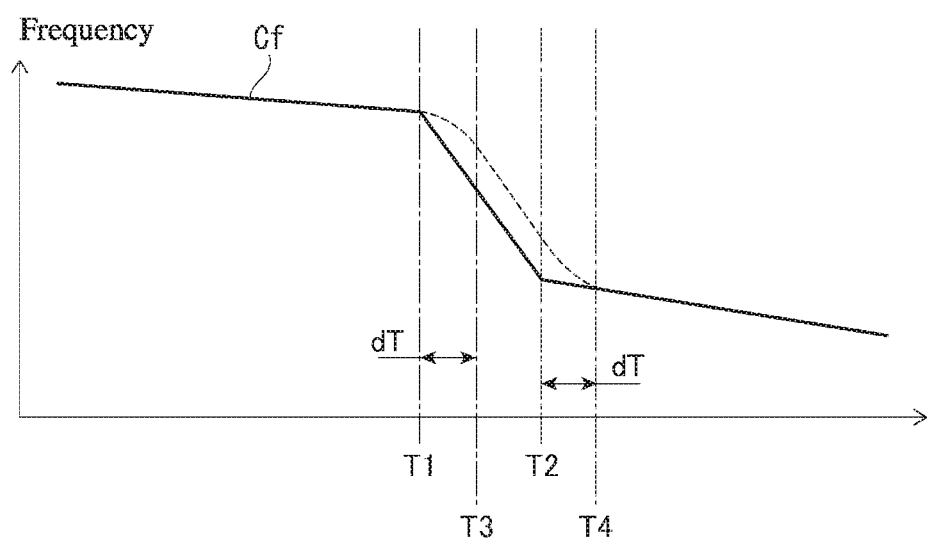
FIG. 6 is a graph illustrating changes in a frequency of a delayed drive signal in the embodiment.

In FIG. 6, through resonance lock control exerted by the resonance lock controller 611, the frequency of the drive signal Cf is configured to decrease gently in a region up to time T1, then to decrease abruptly in a region from the time T1 to time T2, and to decrease gently once more from the time T2 onward. When no tracking delayer 612 is provided, the drive signal Cf illustrated in FIG. 6 is output to the liquid lens apparatus 3 without modification. In contrast, the tracking delayer 612 delays the abrupt reduction that begins at the time T1 by an amount of delay time dT, and as a result, the drive signal Cf reaches a state of abrupt decrease beginning at time T3. Also, the tracking delayer 612 delays the abrupt reduction that begins at the time T2 by an amount of delay time dT, and as a result, the drive signal Cf returns to a state of gentle decrease beginning at time T4. Therefore, even when a change in the frequency of the drive signal Cf is sudden, the change can be delayed and can be restricted to gentle changes with the tracking delayer 612.

Control PC 7

The control PC 7 is connected to the drive controller 61 in order to manipulate image detection conditions, such as the settings of the lens controller 6. The control PC 7 includes a lens console 71 for manipulating settings or the like in the image detection conditions on the lens controller 6; an image processor 72 that imports the detected image Im from the image detector 4 and processes the detected image Im; and an operation interface 73 that receives operations by a user intended for the variable focal length lens apparatus 1. The lens console 71 includes a resonance lock console 711. The resonance lock console 711 can switch the resonance lock controller 611 of the drive controller 61 between enabled and disabled. Also, in a state where the resonance lock controller 611 is enabled, the resonance lock console 711 can switch the tracking delayer 612 between enabled and disabled.

EFFECT OF THE EMBODIMENT

According to the present embodiment, even when an amount of change or a rate of change in the frequency of the drive signal Cf due to the resonance lock controller 611 is large, by delaying the change, the change can be constrained to a gentle change, and a degradation in quality due to a major change in frequency, such as flickering in a measurement image, can be avoided. As a result, in the variable focal length lens apparatus 1, the standing wave can be generated efficiently while obtaining a high-quality image. In addition, flickering in an image or the like can be avoided using the tracking delayer 612, and therefore the necessity of a computer system having a high processing capability in order to speed up the cycle of resonance lock control can be eliminated, and a low-cost variable focal length lens apparatus 1 can be readily achieved.

In the embodiment described above, the low-pass filter is used as the tracking delayer 612, and therefore the tracking delayer 612 can be achieved with a simple configuration, and stable functionality can be achieved at a low cost. The embodiment described above is configured such that the resonance lock console 711 switches the resonance lock controller 611 between enabled and disabled, and also switches the tracking delayer 612 between enabled and disabled. Therefore, an operator can achieve a desired display while observing image quality.

The present invention is not limited to the above-described embodiment, and includes modifications within a scope capable of achieving the advantages of the present invention. In the embodiment described above, a low-pass filter that is connected to an output stage of the resonance lock controller 611 is used as the tracking delayer 612, and the embodiment is configured to delay changes in the frequency of the drive signal Cf. In contrast, the present invention may also be configured to delay a change in the frequency of the drive signal Cf using a time delay element, or a change may be delayed by using a limiter element that limits an amount of change or a rate of change per amount of time for the frequency of the drive signal Cf.

The embodiment described above is configured such that the resonance lock console 711 switches the resonance lock controller 611 between enabled and disabled, and also switches the tracking delayer 612 between enabled and disabled. However, the present invention may also be configured to have no switching, with the tracking delayer 612 always enabled and, similarly, the resonance lock controller 611 always enabled.

In the embodiment described above, a combination of the lens controller 6 and the control PC 7 is used to drive and control the liquid lens apparatus 3, but these components may be configured as an integrated device that collectively performs drive, control, and operation of the liquid lens apparatus 3. However, as in the embodiment described above, by combining the lens controller 6 and the control PC 7, hardware needed for driving and controlling the liquid lens apparatus 3 can be provided independently as a dedicated lens control device. Also, lens controller 6 operations, settings adjustment, and even image import can be achieved using a highly versatile personal computer.

In the embodiment described above, the drive signal Cf and the focal point fluctuation waveform Mf are configured to be sine waves. However, the drive signal Cf and the focal point fluctuation waveform Mf may instead be triangular waves, saw-tooth waves, rectangular waves, or some other waveform. The specific configuration of the liquid lens apparatus 3 may be modified as appropriate. Instead of having a hollow cylindrical shape, the case 31 and the oscillating member 32 may have a hollow hexagonal shape, for example. The dimensions of these components and the properties of the liquid 35 can also be selected as appropriate for the application.

The present invention can be used in a variable focal length lens apparatus and a variable focal length lens control method.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A variable focal length lens apparatus comprising:
   a liquid lens system in which the refractive index changes in accordance with an input drive signal; and
   a drive controller that outputs the drive signal to the liquid lens system, the drive controller comprising:
   a resonance lock controller that changes a frequency of the drive signal by tracking the drive signal to a resonance frequency of the liquid lens system; and
   a tracking delay controller comprising a low-pass filter, that delays a change in the frequency of the drive signal that is due to the resonance lock controller.

2. The variable focal length lens apparatus according to claim 1, further comprising a resonance lock console that switches the resonance lock controller between enabled and disabled, and switches the tracking delay controller between enabled and disabled.

3. The variable focal length lens apparatus according to claim 1, further comprising a resonance lock console that switches the resonance lock controller between enabled and disabled, and switches the tracking delay controller between enabled and disabled.

4. A method of controlling of a variable focal length lens apparatus using a liquid lens system, the method comprising:
   changing a refractive index of the liquid lens system in accordance with an input drive signal;
   outputting the drive signal to the liquid lens system;
   controlling the drive signal to track to a resonance frequency of the liquid lens system; and
   detecting an amount of change in the frequency of the drive signal; and
   delaying, with a low-pass filter, a change in the frequency of the drive signal when the amount of change in the frequency of the drive signal that is due to the controlling of the drive signal exceeds a predetermined limit value.

* * * * *